(12) United States Patent
Accapadi et al.

(10) Patent No.: US 7,912,913 B2
(45) Date of Patent: Mar. 22, 2011

(54) FACILITATING PRESENTATION AND MONITORING OF ELECTRONIC MAIL MESSAGES WITH REPLY BY CONSTRAINTS

(75) Inventors: Jos M. Accapadi, Austin, TX (US); Andrew Dunshea, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1544 days.

(21) Appl. No.: 11/227,031

(22) Filed: Sep. 15, 2005

(65) Prior Publication Data

US 2007/0061423 A1 Mar. 15, 2007

(51) Int. Cl.
*G06F 15/16* (2006.01)

(52) U.S. Cl. .................. 709/207; 709/219; 709/206

(58) Field of Classification Search .......... 709/206–207, 709/219
See application file for complete search history.

(56) References Cited

U.S. PATENT DOCUMENTS

| | | | | |
|---|---|---|---|---|
| 5,694,616 | A * | 12/1997 | Johnson et al. | 709/207 |
| 6,327,046 | B1 | 12/2001 | Miyamoto et al. | |
| 2002/0069116 | A1 * | 6/2002 | Ohashi et al. | 705/26 |
| 2002/0169840 | A1 * | 11/2002 | Sheldon et al. | 709/206 |
| 2003/0018724 | A1 * | 1/2003 | Mathewson et al. | 709/206 |
| 2004/0249890 | A1 * | 12/2004 | Fellenstein et al. | 709/206 |
| 2004/0267887 | A1 * | 12/2004 | Berger et al. | 709/206 |
| 2005/0033845 | A1 | 2/2005 | Perepa et al. | |
| 2005/0267944 | A1 * | 12/2005 | Little, II | 709/207 |

FOREIGN PATENT DOCUMENTS

CN 13555496 A 6/2002

OTHER PUBLICATIONS

U.S. Appl. No. 10/955,199, filed Sep. 30, 2004, Yen-Fu Chen.
U.S. Appl. No. 10/745,484, filed Dec. 29, 2003, Gruen et al.

* cited by examiner

*Primary Examiner* — Benjamin R Bruckart
*Assistant Examiner* — Noel Beharry
(74) *Attorney, Agent, or Firm* — Matthew W. Baca; Amy J. Pattillo

(57) ABSTRACT

A method, system, and program for facilitating presentation and monitoring of electronic mail messages with reply by constraints are provided. Within a network environment, a server receives electronic mail messages with separate selected reply by dates, wherein each electronic mail message is addressed for delivery by the server to at least one particular recipient. The server enables, for display within a user interface accessible to the particular recipient, a separate record for each electronic mail message within an inbox. The inbox include at least one selectable sublevel, wherein upon selection of the particular selectable sublevel of the inbox, only a selection of records for electronic mail messages with a same reply by date as the selectable sublevel are displayed within the user interface.

13 Claims, 7 Drawing Sheets

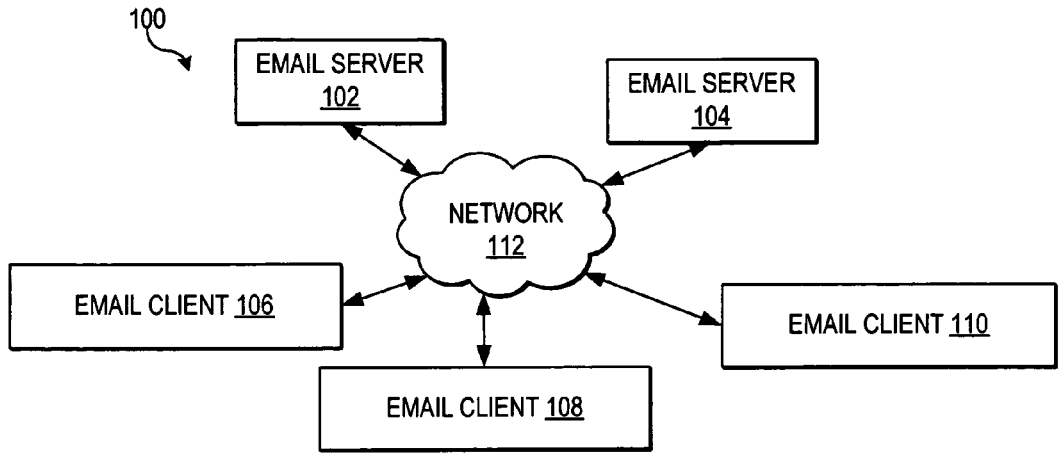
*FIG. 1*
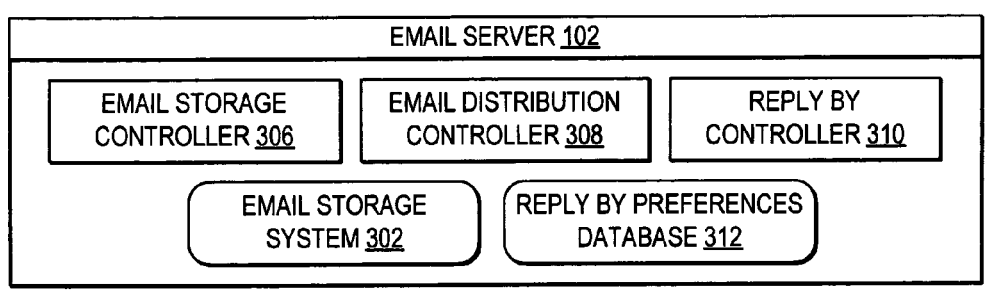
*FIG. 3*
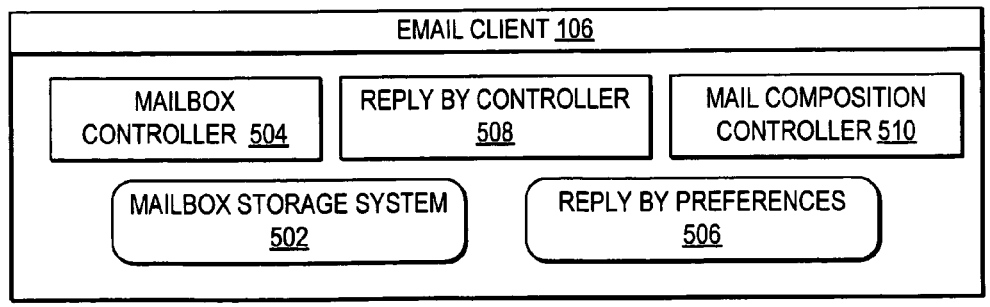
*FIG. 4*
*FIG. 5*

```
                EMAIL MESSAGE - SEND COMPOSITION 600
         ┌─────────┐
         │  SEND   │─602
         └─────────┘
604──── FROM:    │       SELECT ADDRESS        │
606──── TO:      │       SELECT ADDRESS        │
608──── CC:      │       SELECT ADDRESS        │
610──── SUBJECT: │       SPECIFY SUBJECT       │
612──── REPLY BY:│ SELECT DATE │ SELECT APPLICABLE │ SELECT TYPE OF
                 │    614      │  RECIPIENTS  616  │  REPLY  618
         ┌───────────────────┬──────────────────┬────────────────────┐
         │ 1 HOUR            │ ALL RECIPIENTS   │ REPLY MESSAGE      │
         │ 1 DAY    620      │ TO: RECIPIENTS   │ CHECK READ BOX     │
         │ 2 DAYS            │ CC: RECIPIENTS   │                    │
         │ 3 DAYS            │ BUSINESS GROUP   │                    │
         │ SELECT FROM CALENDAR                                      │
         │ "PROJECT A" DEADLINE    MESSAGE 622                       │
         │ NONE                                                      │
         │                                    ┌──────────────────┐   │
         │                                    │ READ MESSAGE 624 │   │
         │                                    └──────────────────┘   │
```

*FIG. 6*

```
                    REPLY BY PREFERENCES 506

PROMPT: AT SIGN ON WITH REPLY BY EMAILS DUE THAT DAY              SENDING
REPLY BY AUTO SET: DEFAULT 1 DAY
 - AUTO SET FOR 2 DAYS FOR EMAILS TO USERS IN GROUP "PROJECT TEAM"
PAST DUE REPLY BY MESSAGES: AUTO DETECT WHETHER RECIPIENT IS AVAILABLE FOR CHAT
COMMUNICATION AND INITIATE CHAT REQUEST IF RECIPIENT IS AVAILABLE + OFFER USER THE
OPTION TO RESEND OR SEND A REMINDER
GRAPHICAL INDICATIONS
 - 2 DAYS OR MORE REMAINING REPLY BY MESSAGES = GREEN
 - 1 DAY REMAINING REPLY BY MESSAGES = YELLOW                      702
 - PAST DUE REPLY BY MESSAGES = RED

PROMPTS: HOURLY WITH UPDATED LIST OF REPLY BY MESSAGE STILL DUE THAT DAY
GRAPHICAL INDICATIONS                                            RECEIVING
 - 3 DAYS OR MORE REMAINING REPLY BY MESSAGES = GREEN
 - 2 DAYS REMAINING REPLY BY MESSAGES = YELLOW                     704
 - PAST DUE REPLY BY MESSAGES = RED
```

FACILITATING PRESENTATION AND MONITORING OF ELECTRONIC MAIL MESSAGES WITH REPLY BY CONSTRAINTS

BACKGROUND OF THE INVENTION

1. Technical Field

The present invention relates in general to improved email communication service and in particular to facilitating composition, presentation, and monitoring of electronic mail messages with reply by constraints.

2. Description of the Related Art

Electronic mail (email) continues to provide a key method of communication between users across the world, where access to the Internet or other network is available. Many email systems receive emails addressed to a particular user and deliver the emails to a computer system at which the particular user is logged in to receive delivery of emails. An email application or web browser executing on the computer system typically receive delivery of emails and present a selectable entry for each email in an inbox. A user may select to open an email from by selecting the entry for that email in the inbox. In addition, the entry for each email in the inbox may include graphical indicators showing whether the email has been opened and whether the email has been replied to.

Many users will receive large volumes of new emails in an inbox each day. With a large volume of emails in an inbox, a user may not be able to open each new email each day. Further, with a large volume of emails in an inbox, a user may open emails, but loose track of which emails the user needs to reply to. Even though the inbox may include graphical indicators of those messages already replied to, a user cannot tell just by looking at entries within the inbox which entries were just for reading and which entries need to be replied to and by when a reply would be timely.

Some inboxes allow users to create separate folders outside the inbox and move emails from the inbox into a folder, for purposes of organization. While a user may create a folder for messages that need to be replied to, to actually use the folder, the user must then open each email message, evaluate whether the email message needs to be replied to, and then drag the email into the folder. When a user receives a large volume of emails, manually opening each email, evaluating what folder to place the email within, and then dragging the email to the folder is a limited, time intensive solution that requires user performance.

Therefore, in view of the foregoing, it would have advantageous to provide a method, system, and program for facilitating user selection of a reply by date on the sending side and then automatically organizing emails with reply by dates within the inbox of the recipient, such that the recipient can quickly view within the inbox those emails which need to be replied to each day.

SUMMARY OF THE INVENTION

Therefore, the present invention provides an improved email communication network environment for facilitating composition, presentation, and monitoring of electronic mail messages with reply by constraints.

In one embodiment, within a network environment, a server receives electronic mail messages with separate selected reply by dates, wherein each electronic mail message is addressed for delivery by the server to at least one particular recipient. The server enables, for display within a user interface accessible to the particular recipient, a separate record for each electronic mail message within an inbox. The inbox include at least one selectable sublevel, wherein upon selection of the particular selectable sublevel of the inbox, only a selection of records for electronic mail messages with a same reply by date as the selectable sublevel are displayed within the user interface.

The server may receive electronic mail messages from a sending client system that facilitates selection of the reply by date by a user composing and sending the electronic mail message. In addition, electronic mail message may include other reply by constraints, such as designating only a selection of the total recipients of the electronic mail message to receive the reply by date and designating the type of reply requested.

The server monitors electronic mail messages sent with reply by dates and detects when a reply is not received to a particular electronic mail message prior to the expiration of the reply by date for the electronic mail message. Upon detection of an unreplied to electronic mail message with an expired reply by date or an almost expired reply by date, the server may detect whether the intended recipient is available for chat communications and automatically initiate a chat session between the sending user and an available intended recipient.

In addition, the server monitors whether electronic mail messages are actually delivered to intended recipients prior to the expiration of the reply by date and may automatically alert a sender if the current date passes the reply by date and the server has not been able to deliver a particular electronic mail message to an intended recipient.

The server detects replies to electronic mail messages marks the record for an electronic mail message if a reply is composed and sent. In addition, when the server detects a reply electronic mail message, the server adjusts the display of the record for the originating electronic mail message within the user interface into the general inbox level or another folder.

In addition, the server monitors records under sublevels of the inbox and adjusts a graphical indicator for each sublevel to indicate the proximity to the current date of the reply by date for each sublevel. Additionally, the server may prompt a recipient with a listing of the records still within a sublevel with the reply by date matching the current date.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram depicting a network environment for supporting email communications between email clients;

FIG. 3 is a block diagram depicting examples of functional components of an email server for supporting email communications;

FIG. 4 is an illustrative diagram illustrating the a selection of emails with reply by entries intended for a particular recipient and stored at an email server;

FIG. 5 is a block diagram depicting examples of functional components of an email client for supporting email communications;

FIG. 6 is an illustrative diagram illustrating a user interface for a sender composition of an email that includes a reply by entry;

FIG. 7 is an illustrative diagram depicting examples of reply by preferences for a particular user;

DETAILED DESCRIPTION OF THE PREFERRED EMBODIMENT

Figure 2:
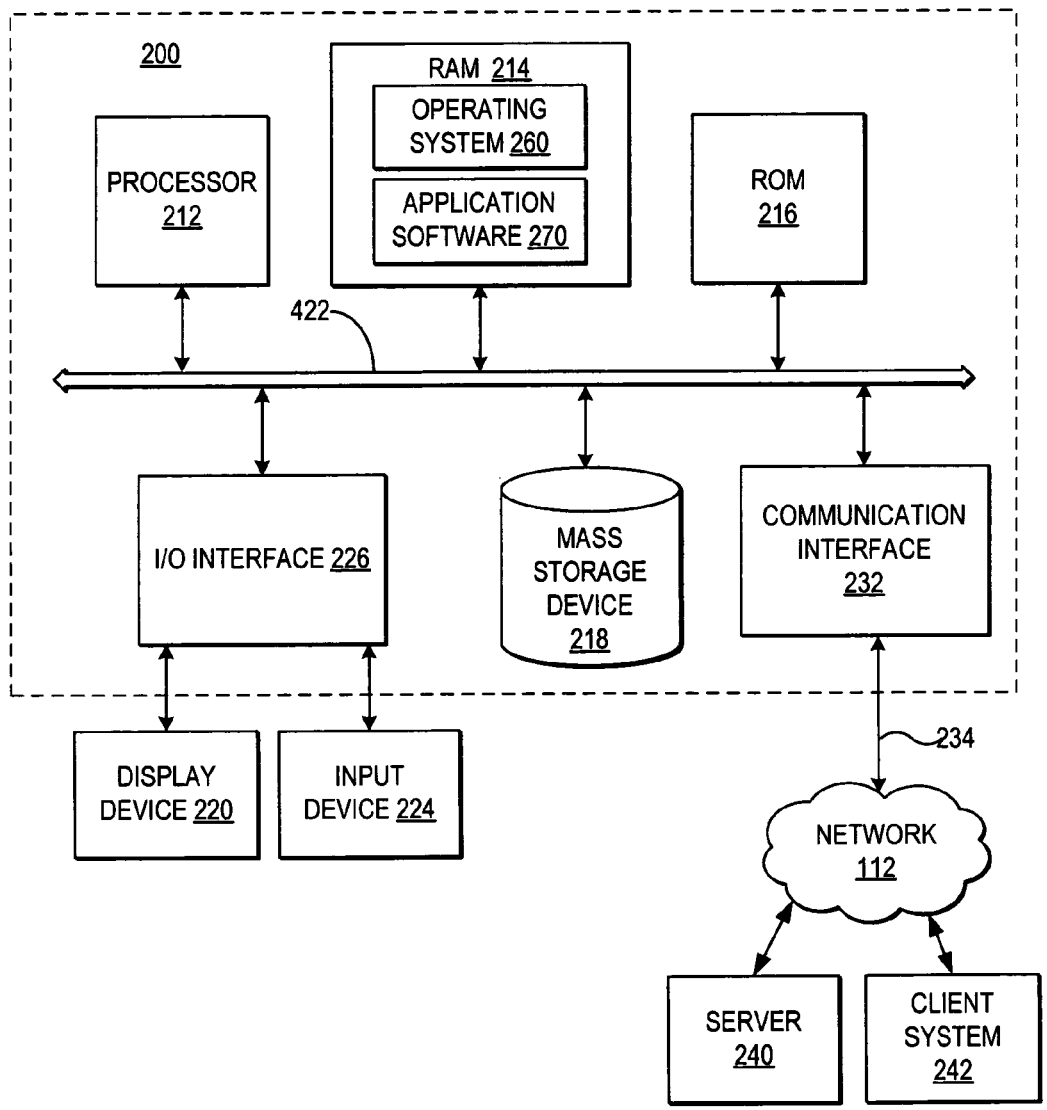
FIG. 2 is a block diagram illustrating one embodiment of a computing system through which the email server or email client and the present method and program product may be implemented.

With reference now to FIG. 1, a block diagram depicts a network environment for supporting email communications between email clients. It will be understood that the distributed network environment depicted is one example of a network environment for supporting email communications between email clients; other embodiments of systems enabled to communicate via a connection may support the email communications of the present invention.

In the embodiment, a network environment 100 includes a network 112, which is the medium used to provide communications links between various devices and computers connected together within network environment 100. Network 112 may include multiple types of combinations of connections, including but not limited to, permanent connections such as wire or fiber optics cables, temporary connections made through telephone connections and wireless transmission connections.

In addition, in the embodiment, network environment 100 includes email servers 102 and 104 and email clients 106, 108, and 110, each communicatively connected to network 102. Each of email servers 102 and 104 and email clients 106, 108, and 110 represent computer systems or groupings of computer systems, where a computer system is further described with reference to FIG. 2. In addition, it will be understood that other email servers, email clients and other types of computer systems may be communicatively connected to network 102 for supporting email communications.

In general, email server 102 and email server 104 are described with reference to the facilitating email transmissions between email clients 106, 108, and 110. Email clients 106, 108, and 110 are described with reference to providing a user interface for composing and reading emails and facilitating communications with an email server 102 or 104 for sending and receipt of emails. It will be understood, however, that each of email servers 102 and 104 may perform additional functions, including any of the functions described with reference to email clients and that each of email clients 106, 108, and 110 may perform additional functions, including any of the functions described with reference to email servers.

Email servers 102 and 104 and email clients 106, 108, and 110 may be connected within network environment 100 in conformance with different network architectures. In one example, within a client-server architecture, network environment 100 includes the Internet and network 120 represents a worldwide collection of networks and gateways that the use the transmission control protocol/internet protocol (TCP/IP) suite of protocols to communicate with each other; in another example, network environment 100 includes an intranet and network 120 facilitates a local area network (LAN) or wide area network (WAN). Additionally, within a peer-to-peer architecture, email clients 106, 108, and 110 may directly communicate with each other, by sending email messages, via network 120, without an email server acting as an intermediary. Further, software function calls as may be defined in an application programming interface (API) executing on each of the computer systems (email servers 102 and 104 and email clients 106, 108, and 110) may be used to implement communication between the computer systems or computer systems may communication by passing email messages, for example directly through a commonly-defined message passing port interface or indirectly through reading and writing shared memory.

In one example, users are provided with an email address supported by a particular email service provider. In one example, the email service provider is a business enterprise that provides email service to its employees as email subscribers. In another example, the email service provider is an independent provider to which individuals and business subscribe for service. It will be understood that in alternate embodiments, other types of email service providers may provide email service to subscribers.

In particular, the email service provider acts as an intermediary for receiving emails addressed to a particular user's email address and for delivering emails sent by the particular user. In addition, the email service provider may allocate a predetermined amount of storage space for each user for storage of sent and received emails. Each of email servers 102 and 104 may support the email services provided by one or more email services providers.

In the embodiment, users log in at email clients 106, 108, and 110 to access the email service of a particular email service provider. In particular, email clients 106, 108, and 110 may facilitate subscriber email communication through a web browser application, through a collaboration application, such as Lotus Notes, or through other application software that enables a computing system to facilitate email communication for a user.

In one example, "user A" is a subscriber of the email service provider "A" which is supported by email server 102 and "user B" is a subscriber of the email service provider "B" which is supported by email server 104. "User A", while logged in at email client 106 sends an email addressed to "user B". Email client 106 sends the email to email server 102. Email server 102 locates the email service provider for "user B" and forwards the email to email server 104. When "user B" logs in to receive email service from email service provider "B", for example at email client 108, email client 108 requests delivery of any previously undelivered emails to "user B". In addition to delivering the previously undelivered email from "user A", email server 104 may also provide "user B" with access, through email client 108 to all other emails stored by email server 104 in a mailbox storage space for "user B".

In general, an email client, such as email client 106, 108, or 110, facilitates a user interface for composition of emails. In facilitating user composition of a single email, email composition interface may provide an interface with a header portion and a message portion. The header portion may include prompts for entry of information such as the email address for the sender, the email address for one or more recipients, and a subject of the email. The message portion may include a space in which a user may insert text, audio, video, graphics, and attachments. When a user selects to send the composed email and the email is delivered, additional information may be added to the header, such as a time submitted, a time delivered, and routing information.

In addition, in general, the email client, such as email client 106, 108, or 110, facilitates a user interface for presenting records of emails for selection by a user and for displaying emails for the user to read. In one example, an email client presents a record for each incoming email in an inbox list. The user is then enabled to search through the records in the inbox list and select a record to open the email associated with the record. Additionally, in presenting records of emails for selection by a user, records of emails sent by the user may be presented in an outbox list. The user is then enabled to search through the records in the outbox list and select a record to open the email associated with the record and sent by the user.

According to an advantage, an email client, such as email client 106, 108, or 110 includes a prompt within the header portion of composition interface for user entry of a reply by entry. The reply by entry may include multiple selectable fields of information including, but not limited to, a reply by date, the recipients to which the reply by date is applicable, and the type of reply expected.

In one embodiment, the email client, such as email client 106, 108, or 110, from which the email with a reply by entry is sent, in storing a record for the sent email, may add a sublevel to the outbox list that indicates the date specified in the reply by entry for the email. In addition, any email servers, such as email server 102 or 104, receiving the email with a reply by entry may store a record for the email. Further, any email clients, such as email client 106, 108, or 110, receiving the email with a reply by entry, in presenting a record for the received email with a reply by entry, may add a sublevel to the inbox list that indicates the date specified in the reply by entry for the email. By including records of emails with reply by entries within the inbox list and the outbox list, but automatically organized under a sublevel specified by the date in the reply by entry, a user is able to quickly select to view only those emails that the user sent or needs to reply to with reply by dates for a particular day or time.

Each of the email clients and email servers storing a record of the email with a reply by entry may monitor whether the email is delivered to the intended recipient prior to passing the reply by date and whether a recipient replies to the email within the reply by date and may prompt a sender and intended recipient with information about the email with the reply by date according to user preferences and according to business preferences. In one embodiment, if a business provides email address subscriptions to employees, then the business may also specify preferences for information included in a reply by entry and responses by an email client or email server to emails with reply by dates.

In addition to facilitating email communications between email clients in network environment 100, email servers 102 and 104, email clients 106, 108, and 110 and other server and client systems may facilitate chat communications, where chat communications are real-time communications exchanged in a chat session opened between at least two users. In facilitating chat communications, the presence of a user that indicates the user's availability to participate in chat communications, is accessible by other users with chat service accessible. In one embodiment, an email service provider facilitates both email based and chat based communications for a subscriber.

Referring now to FIG. 2, a block diagram depicts one embodiment of a computing system through which the email server or email client and the present method and program product may be implemented. The present invention may be executed in a variety of systems, including a variety of computing systems and electronic devices.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as an email server, computer system 200 may include multiple processors designed to improve network servicing power.

Processor 212 may be a general-purpose processor such as IBM's POwerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may provide a graphical user interface (GUI) to the user. In one embodiment, application software 270 contains machine executable instructions for controlling email communications that when executed on processor 212 carry out the operations depicted in the flowcharts of FIGS. 10-13 and other operations described herein with reference to the controllers in the email servers and chat clients. Alternatively, the steps of the present invention might be performed by specific hardware components that contain hardwired logic for performing the steps, or by any combination of programmed computer components and custom hardware components.

The email communications of the present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded as a computer program product, wherein the program instructions may be transferred from a remote computer such as a server 240 or client system 242 to requesting computer system 200 by way of data signals embodied in a carrier wave or other propagation medium via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 112.

Network link 234 and network 112 both use electrical, electromagnetic, or optical signals that carry digital data streams. The signals through the various networks and the signals on network link 234 and through communication interface 232, which carry the digital data to and from computer system 200, are exemplary forms of carrier waves transporting the information.

When implemented as an email server, computer system 200 may include multiple communication interfaces accessible via multiple peripheral component interconnect (PCI) bus bridges connected to an input/output controller. In this manner, computer system 200 allows connections to multiple network computers via multiple separate ports.

In addition, computer system 200 typically includes multiple peripheral components that facilitate communication. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, but may also include other output interfaces, such as an audio output interface. In alternate embodiments of the present invention, additional input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

With reference now to FIG. 3, a block diagram depicts examples of functional components of an email server for supporting email communications in accordance with the method, system, and program of the present invention. In particular, examples of functional components of email server 102 are depicted. The functional components of email server 102 may be implemented within multiple network architectural layers, depending on the server system, including, but not limited to, the network layers, the operating system layer, the middleware layer, and the application layer. In addition, it will be understood that additional functional components may be included in email server 102 and the functional components depicted may be performed by multiple email server, such as email server 104, and may be distributed across multiple email client and server systems. Further, email server 102 may support email communications for a single or multiple email service providers.

As illustrated, email server 102 includes an email storage controller 306 that controls receipt of emails into an email storage system 302. In addition, as illustrated, email server 102 includes an email distribution controller 308 that controls distribution of emails from email storage system 302 to another email server or to an email client.

Email storage system 302 may be implemented through multiple types of data storage structures. In particular, email storage system 302 may organize emails for storage according to email address. In one example, email storage controller 306 receives and stores emails for "user A" and "user C" in email storage system 302, where email storage system 302 includes a first separate logical storage area for the emails sent by and received for "user A" and a second separate logical storage area for the emails sent by and received for "user C".

In addition, as emails are received by and sent from email server 102, a record for each email stored in email storage system 302 is created and updated. For example, when "user A" sends an email, the email is first received by email storage controller 306 and stored in email storage system 302. Email distribution controller 308 locates the email service provider that provides service for each addressed recipient in the email, such as "user B", delivers the email to the email server facilitating the email service for "user B", and records the delivery date, time, and success of delivery with the email record in email storage system 302. In another example, when "user C" sends an email to "user A", email storage controller 306 receives the email and stores the email in email storage system 302 for "user A", with the record for the email marked as undelivered. An email client 106 through which "user A" is logged on, requests delivery of all undelivered emails for "user A" from email server 102. Email distribution controller 308 searches the records of emails in email storage system 302 for all undelivered emails addressed to "user A", such as the email from "user C", and controls delivery of the undelivered emails to the email client; once the emails are delivered, distribution controller 308 updates the records for those emails to indicate a delivery date and time.

In addition, email server 102 includes a reply by controller 310. Reply by controller 310 manages actions by email server 102 in response to email server 102 facilitating delivery of emails that include a reply by entry. In particular, each email subscriber to the email service provided by email server 102 may select preferences for actions to be taken by email server 102 with respect to emails to or from that email subscriber that include a reply by entry. Each email subscriber's preferences are included in a reply by preferences database 312. In addition, the email service provider or business subscriber may specify general preferences with respect to actions to be taken by email server 102 with respect to emails that include a reply by entry.

In particular, reply by controller 310 monitors email records that include a reply by entry. Referring now to FIG. 4, an illustrative diagram depicts the presentation of emails with reply by entries filtered from email storage system 302 by subscriber. In particular, mail storage 400 depicts a portion of the email records for emails being held for delivery to "user A" within email storage system 302. In the example, each email record includes a reply by entry, a sender address (from), a subject, an indicator of whether the email has been delivered to "user A", an indicator of whether the sender has been alerted that the email has not been delivered, and an indicator of whether the recipient has replied to the email. In addition to marking a "Y" for yes or "N" for no in mail storage 400 for each record, additional information such as a date and time, routing paths, and other pertinent information may be included for each email record.

The reply by preferences, in reply by preferences database 312 for a particular user or the general preferences, specify the actions to be taken responsive to the conditions of each email record with a reply by entry. For example, a reply by preference for "user A" may request that if emails have not yet been delivered to "user A" and the current date is past the reply by date for the email, then reply by controller 310 should compose and send an email or other communication indicating that "user A" has not logged on to receive delivery of the email prior to the reply by date.

In the example illustrated in FIG. 4, where the current date is "2005-10-13", then the current date is past the reply by dates for entry 402, entry 404, and entry 406 and the current date is the same as the reply by date for entry 408. Entry 402 and entry 404 have already been delivered to "user A", but entry 406 has not been delivered to "user A". Entry 906 indicates, however, that reply by controller 310 detected the undelivered email with an expired reply by date and alerted the sender of the email that the email is not yet delivered. In addition, in the example, if the email for entry 908 is not delivered as of the end of the day "2005-10-13", then reply by controller 310 would alert the sender of the entry 908 email that the email is not yet delivered from the email server to the and the reply by date is past due.

In another example, a reply by preference may specify an action to be taken if a reply to an email with a reply by entry is not detected by reply by controller 310 before the expiration of the reply by date. For example, an email service subscriber, such as a business, may set a preference that if an email sent by an employee subscriber, with a reply by date, has not been replied to by the reply by date but the email has been delivered, then reply by controller 310 should automatically create a reminder email addressed to the intended recipient that reminds the intended recipient to reply to the email. In another example, a subscriber may set a preference for reply by controller 310 to prompt the subscriber each day with emails with past due reply by entries and allow the subscriber to select which emails reply by controller 310 should send a reminder email for. Further, a subscriber may select a preference for reply by controller 310 to detect whether the addressee of an email with a reply by date that is past due is available for chat communications and either inform the subscriber that the addressee is available or automatically initiate a chat communication with the addressee with a reminder to reply to the email.

In the example illustrated in FIG. 4, entry 402 indicates that the associated email was delivered, the sender was alerted to a late delivery, but "user A" has not replied to the email. When reply by controller 310 detects that "user A" is available to receive communications, reply by controller 310 will perform an action triggered by the applicable reply by preferences. For example, reply by controller 310 may send a communication to "user A" prompting "user A" to reply to the email identified by entry 402

In particular, reply by controller 310 or another controller marking an email as replied to may, for example, detect an email with header information that indicates the original email being replied to or detect a subject line with "re:" and the subject or some other indicator that the email is a reply to a previous email and mark the record for the replied to email. For example, if reply by controller 310 detects a reply to the email identified by entry 402, then reply by controller 310 would mark the record as now replied to. In another example, reply by controller 310 may perform other types of analysis, such as scanning the message portion of newly received emails for matches with previous emails waiting to be replied to. Further, an email service provider may specify other proprietary types of indicators, detectable by reply by controller 310, of a reply email within the header or message of the reply email.

It is important to note that while email storage system 302, email storage controller 306, email distribution controller 308, reply by controller 310, and reply by preferences database 312 are illustrated as separate functional components, any combination of these components may be integrated into a single functional components. Further, any of these components may be integrated as a plug-in to any of the other components on email server 102.

With reference now to FIG. 5, a block diagram depicts examples of functional components of an email client for supporting email communications in accordance with the method, system, and program of the present invention. In particular, examples of functional components of email client 106 are depicted. The functional components of email client 106 may be implemented within multiple network architectural layers, depending on the client system, including, but not limited to, the network layers, the operating system layer, the middleware layer, and the application layer. In addition, it will be understood that additional functional components may be included in email client 106 and the functional components depicted may be performed by multiple physical client systems and may be distributed across multiple email client and server systems. Further, email client 106 may support email communications for a single or multiple email service providers.

As illustrated, email client 106 includes a mailbox controller 504 for controlling the delivery of composed emails to an email server and for receiving delivery of emails addressed to a subscriber from an email server. A user may select to trigger mailbox controller 504 to deliver or request delivery of emails from an email server. In addition, mailbox controller 504, while a subscriber is logged in, may automatically deliver and request delivery of emails periodically. Further, mailbox controller 504 may manage multiple email subscriber addresses, for a single or multiple users, subscribing to a single or multiple separate email service providers.

In addition, as illustrated, email client 106 includes a mailbox storage system 502. Mailbox storage system 502 may include emails composed by the subscriber as drafts that are not yet sent, emails composed and delivered by mailbox controller 504, and emails delivered to the subscriber as retrieved by mailbox controller 504.

Mailbox controller 504 also controls the presentation to the subscriber of records of emails stored in mailbox storage system 502. In one embodiment, mailbox controller 504 displays emails that are received in an inbox, displays emails that are sent in an outbox and displays emails that are stored as drafts in a drafts box.

According to an advantage, reply by controller 508 automatically organizes the presentation of emails that include reply by entries under sublevels of the inbox and outbox, where each sublevel is specified by a reply by date. In addition, reply by controller 508 monitors the emails with reply by entries, both in the inbox and outbox, and triggers actions responsive to applicable preferences within reply by preferences 506, as will be further described.

A mail composition controller 510 facilitates subscriber composition of emails and viewing of emails, as selected from the records in the inbox, outbox, drafts box or other record presentation. In particular, mail composition controller 510 may facilitate subscriber composition of a reply email to an email received by the subscriber. In one example, in the interface for displaying the received email, mail composition controller 510 provides the user with a selectable option to reply to the received email. Upon user selection to reply to the received email, mail composition controller 510 opens a new composition window with a subject line in the header automatically filled in with the received email subject line, preceded by "re:" and with the message portion already filled in with message of the received email. In other examples, other types of indicators may be added to an email to indicate that the email is a reply email.

Further, according to an advantage, mail composition controller 510 facilitates subscriber composition of email that includes a reply by entry in the header of the email. In particular, a user may specify, for any email composition, a reply by date, which addresses to constrain to the reply by date, and the type of reply requested, as will be further described with reference to FIG. 6.

Referring now to FIG. 6, an illustrative diagram depicts a user interface for a sender composition of an email that includes a reply by entry. As illustrated, a sender composes an email within email composition interface 600. Email composition interface 600 may include multiple selectable options, such as send button 602. Upon user selection of send button 602, the information entered in email composition interface 600 is transferred as an email message.

In specifying an email, a user may designate a "from" field 604 with a particular address of a sender, a "to" field 606 with one or more addresses of intended recipients, a "cc" field 608 with one or more addresses of intended recipients to receive a "carbon copy" of the email, a "subject" field 610 with a specified subject of the email, and a "reply by" field 612 with multiple entry fields. Further, a message field 622 includes the message content of the email. It will be understood that additional fields may be included in the header of email composition interface for specifying an email.

In selecting addresses for "to" field 606 and "cc" field 608, a user may select from a pull down menu of addresses or from a directory of addresses. A user may organize email addresses in a directory under different groupings, such that a user may also select the grouping to select all the email addresses under that grouping.

In the example depicted, "reply by" field 612 includes multiple subfields with pull down menus of available options, including a "date" field 614, an "applicable recipients" field 616, and a "type of reply" field 618. In the example, a user may select from the pull down menus for each of the subfields by positioning a cursor 620 and entering another input.

For "date" field 614, in the example, a user may enter a date or the user may select a date from the pull down menu which includes selectable dates of "1 hour", "1 day", "2 days", "3 days" and additional selectable options of "select from calendar" which triggers a selectable calendar within the display area, "project A deadline" which triggers a date specified in a calendar or user preferences for the deadline, or no reply by date. It will be understood that a user may specify selectable dates and additional selectable options for display within the pull down menu for "date" field 614. In addition, previous date entries by the user may be automatically added to the pull down menu for "date" field 514.

For "applicable recipients" field 616, in the example, a user may select to apply the reply by entries to all recipients, those recipients listed in "to" field 606, those recipients listed in "cc" field 608, or those recipients who addresses are included in a directory under a "business group" folder. In addition, the pull down menu may include other selectable options for specifying the applicable recipients. It will be understood that the user may specify applicable recipient options for display in the pull down menu for "applicable recipients" field 616.

For "type of reply" field 618, in the example, a user may select to specify the type of reply required by entering a type of reply or selecting from the pull down menu which includes selections of "reply message" and "check read box". In the example, if the user selects for the type of reply to be "check read box", then a selectable button 624 may be added to the email, such as within message 622. In addition, in the example, if the user selects a reply type, then a textual or graphical addition may be included in message 622 indicating the type of reply required.

With reference now to FIG. 7, an illustrative diagram depicts examples of reply by preferences for a particular user. In the example, reply by preferences 506 include sending preferences 702 for actions to be triggered for emails sent by the user with reply to entries and receiving preferences 704 for actions to be triggered for emails received by the user with reply to entries.

In the example, sending preferences 702 includes a preference to trigger a prompt window at sign on each day, where the window includes the emails sent by the user that have not been replied to and the reply to date is the current date. A user may select a preference for other types of prompts that are triggered at other times.

In addition, in the example, sending preferences 702 includes a preference for automatically setting the reply by date when composing emails. In the example, the user selects a preference for the default date of "1 day" and a specialized preference for the date set for messages sent to users with addresses included under the group "project team" in the user's address directory. It will be understood that a user may select preferences for automatically filling each of the subfields for a reply by entry. In addition, a user may specify, in sending preferences 702, the selectable options to include in a pull down menu for a reply by entry field, such as the pull down menus illustrated in FIG. 6 for each reply by entry field.

Further, in the example, sending preferences 702 includes a preference for responding to emails with reply by dates that are past due. In the example, a user sets a preference for the reply by controller to automatically detect whether the recipient of the past due reply to date email is available for chat communication and if the recipient is available for chat communication, initiate a chat session with the user. In addition, if the recipient is not available, the user selects a preference for the reply controller automatically sends a reminder to the recipient to reply to the email.

In addition, in the example, sending preferences 702 includes a preference for adjusting the graphical indications of the reply by sublevels of the sending user's outbox, where each sublevel includes records of the emails sent by the user with reply by dates for the same day. In the example, sublevels for reply by dates that have 2 or more days remaining are green; sublevels for reply by dates that have 1 day remaining are yellow; and sublevels for reply by dates that are past due are red.

Further, in the example, sending preferences 702 includes a preference for abandoning a reply by entry of an email. In the example, if a reply by date for an email is 4 days or more overdue and a reminder was set to the recipient to reply, but no reply has been received, then user's preference is for the reply by controller to abandon the reply by entry and move the email out of a reply by sublevel and into the general outbox.

In the example, receiving preferences 704 include a preference to trigger a prompt window hourly with an updated list of the emails still remaining to reply to with reply to dates matching the current date.

In addition, receiving preferences 704 include a preference for adjusting the graphical indications of the reply by sublevels of the receiving user's inbox, where each sublevel includes records of the emails received by the user with reply by dates for the same day. In the example, sublevels for reply by dates that have 3 or more days remaining are green; sublevels for reply by dates that have 1-2 days remaining are yellow; and sublevels for reply by dates that are past due are red.

Figure 8:
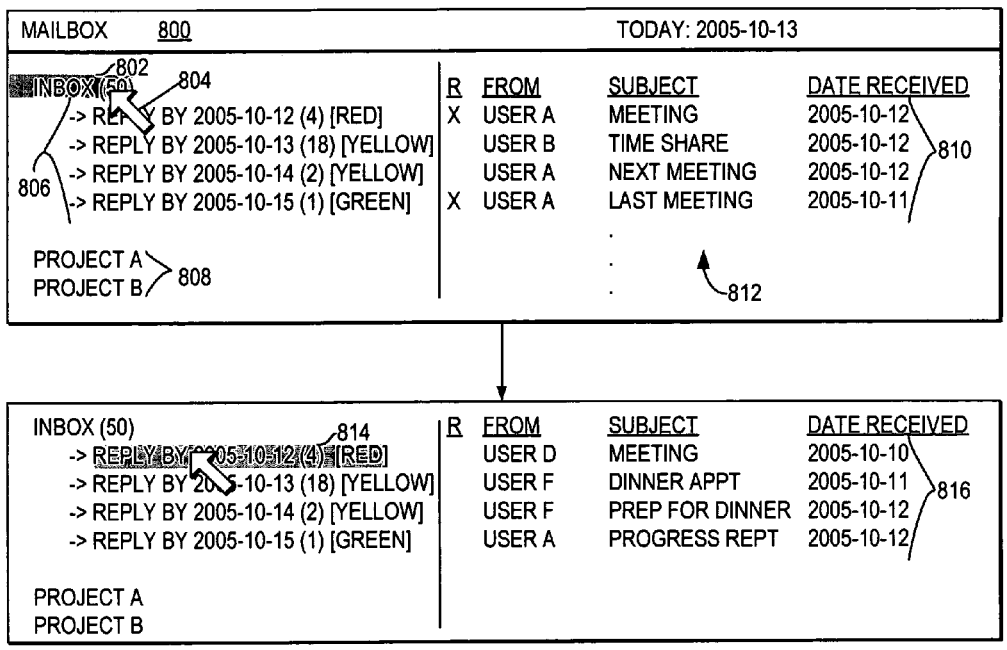
FIG. 8 is an illustrative diagram illustrating the presentation of emails with reply by entries received within a mailbox.

Referring now to FIG. 8, an illustrative diagram depicts the presentation of emails with reply by entries received within a mailbox. Mailbox 800 includes a record display area 812 for displaying records for multiple emails received or sent by the user. Examples of several of the records for emails received by the user are depicted at reference numeral 810. A return (R) column indicates, for each email record, whether the recipient has replied to the email.

Records for new emails are generally organized in association with inbox 802. In alternate embodiments, records for new emails may also be automatically placed in a folder, such as the folders "project A" and "project B" illustrated at reference numeral 808. Additionally, records for email that a spam filter labels as spam may be automatically placed in a folder rather than in association with inbox 802.

Inbox 802 indicates the number of email records organized under inbox 802. Selection of the label for inbox 802, as indicated by the shading, using cursor 804 or other selection tool, triggers display of the email records organized under inbox 802, such as the records indicated at reference numeral 810.

In addition, inbox 802 includes multiple sublevels, as illustrated at reference numeral 806, where each sublevel is graphically indicated by a different color and indicates the number of email records falling within the sublevel. In the example, the sublevels indicated at reference numeral 806 are graphically indicated by different colors according to the preferences specified in the example of user preferences 506 in FIG. 7. In particular, the current date is indicated as "2005-10-13", so the sublevel for "2005-10-12" is past due and the sublevel for "2005-10-13" is still considered 1 day remaining until the end of the day.

As illustrated, initially a user selects to view the records listed generally under inbox 802. As a user selects to view the records listed under the sublevel, such as the reply by sublevel for "2005-10-12" as indicated by the shading at reference numeral 814, only those email records with reply by dates of "2005-10-12" are displayed within record display area 812, as indicated at reference numeral 816. When a user replies to an email, however, such as one of the emails indicated by the records at reference numeral 816, the email record is updated so that the return (R) field for the record indicates that the recipient has replied to the email. In addition, once a user replies to one of the emails indicated by the records at reference numeral 816, the record for that email is moved out of the reply by sublevel and into the general inbox level. As a user replies to emails, when a reply by sublevel is empty, the reply by controller may remove the sublevel from inbox 802.

In one embodiment, once each of the records for new emails with reply by entries are placed under a corresponding reply by levels, such as the one of the reply by levels indicated at reference numeral 806, the user may select one of the sublevels and move individual records from one sublevel to another to set a recipient specified reply by date. In one example, a user may only be permitted to move email records from one sublevel to another sublevel with a reply by date closer to the current date. In another example, if a user selects to move an email record from one sublevel to another sublevel with a reply by date later than the one set by the sender, then the reply by controller may automatically compose and send and message to the sender indicating that the recipient has adjusted the reply by date.

Figure 9:
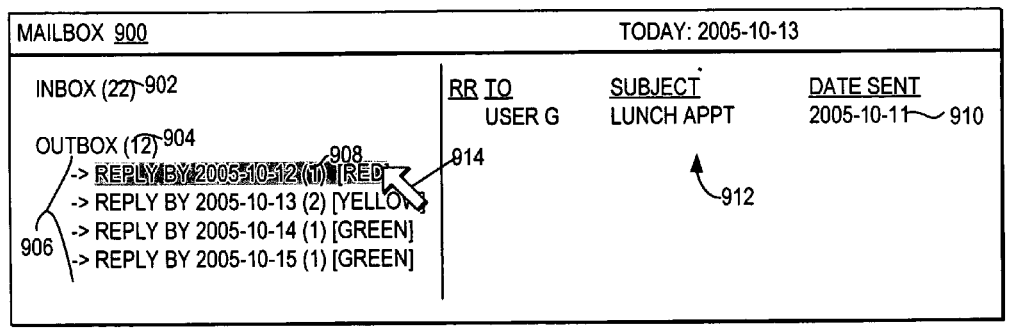
FIG. 9 is an illustrative diagram depicting the presentation of emails with reply by entries sent by a user.

With reference now to FIG. 9, an illustrative diagram depicts the presentation of emails with reply by entries sent by a user. Mailbox 900 includes a record display area 912 for displaying records for multiple emails received by sent by the user. An example of a record for an email sent by the user is depicted at reference numeral 910. A return reply (RR) column indicates, for each email record, whether a reply to the email has been received.

In the example, mailbox 900 includes email records for emails received for the user organized under an inbox 902. In addition, mailbox 900 includes email records for emails sent by the user under an outbox 904. Both inbox 902 and outbox 904 indicate the number of records under each organizational level.

In a similar manner as described with reference to inbox 802 of FIG. 8, inbox 902 and outbox 904 includes multiple sublevels, as illustrated in outbox 904 at reference numeral 906, where each sublevel is graphically indicated by a different color and indicates the number of email records falling within the sublevel. In the example, the sublevels indicated at reference numeral 906 are graphically indicated by different colors according to the preferences specified in the example of user preferences 506 in FIG. 7.

As illustrated, as a user selects to view the records listed under a sublevel using cursor 914, such as the reply by sublevel for "2005-10-12" as indicated by the shading at reference numeral 908, only those email records for emails sent with reply by dates of "2005-10-12" are displayed within record display area 912, as indicated at reference numeral 910. When a reply to the record indicated at reference numeral 810 is received, the email record will be updated so that the return reply (RR) field for the record indicates that the sender has received an email in reply to the email indicated by the record. In addition, a return reply to an email is marked in the record indicated at reference numeral 910, the email record is moved out of the reply by sublevel and into the general outbox level. As return replies are received, when a reply by sublevel is empty, the reply by controller may remove the sublevel from outbox 904.

Figure 10:
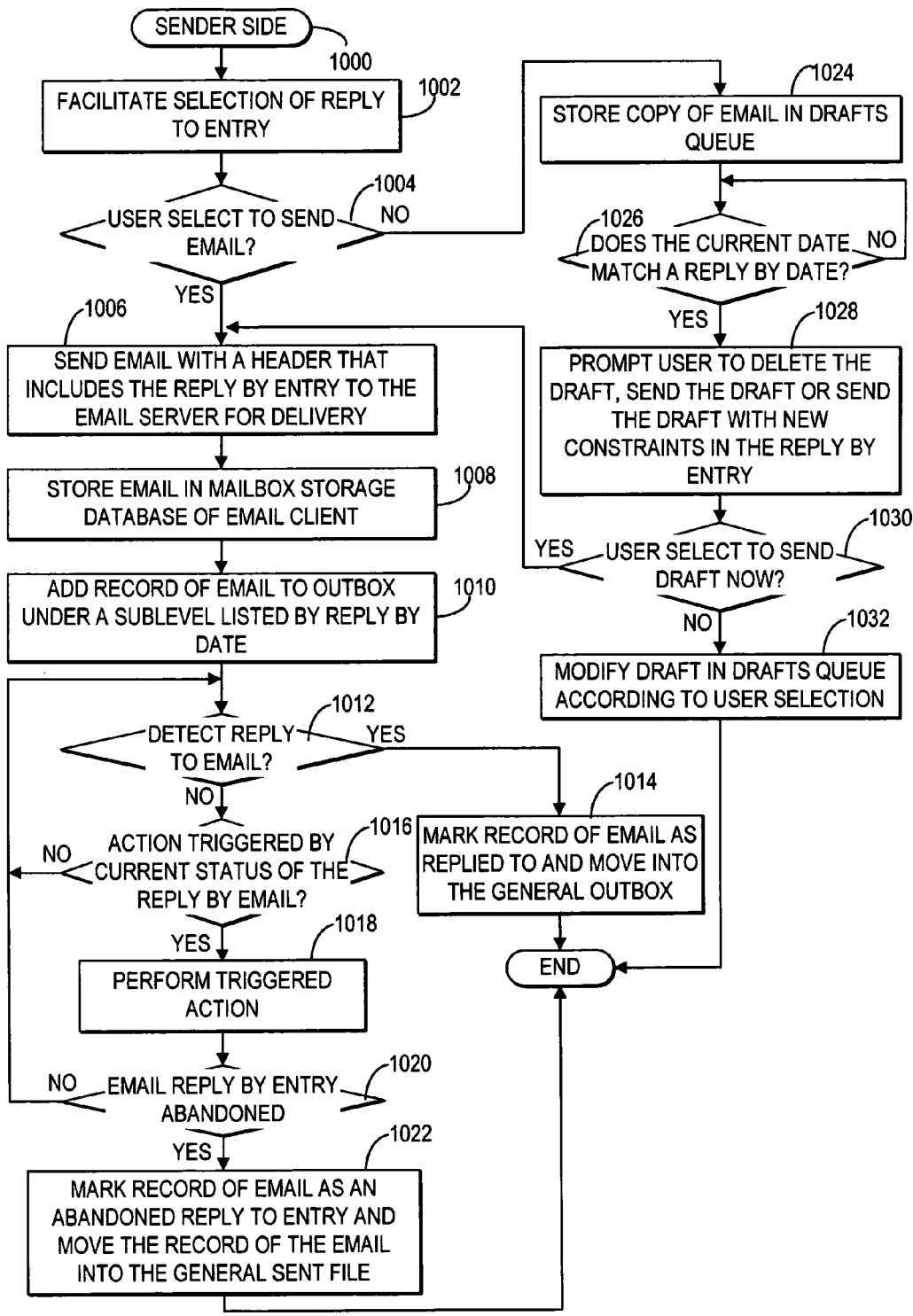
FIG. 10 is a high level logic flowchart illustrating a process and program for managing emails with a reply by entry sent from an email client

Referring to FIG. 10, a high level logic flowchart depicts a process and program for managing emails with a reply by entry sent from an email client. As illustrated, the process starts at block 1000 and thereafter proceeds to block 1002. Block 1002 depicts facilitating selection of a reply by entry, and the process passes to block 1004. In one embodiment, the constraints of a reply by entry are automatically filled in based on user preferences or business rules. In another embodiment, a user selects the specific constrains for the reply by entry.

Block 1004 depicts a determination whether the user selects to send the email with the reply by entry. If the user selects not to send the email, then the process passes to block 1024. Block 1024 depicts storing a copy of the email in a drafts queue that is sorted by reply by date. Next, block 1026 depicts a determination of whether the current date matches the date in the reply by entry. If the current date does not match the date in the reply by entry, then the process iterates at block 1026. When the current date reaches the date in the reply by entry, the process passes to block 1028. Block 1028 depicts prompting the user to select to delete the draft, send the draft or send the draft with new constraints in the reply by entry. In addition, a user may continue to store the draft without a reply by entry or with new constraints in the reply by entry. Block 1030 depicts a determination whether user selects to send the draft now as an email, then the process passes to block 1006. If the user does not select to send the draft now, then the process passes to block 1032. Block 1032 depicts modifying the draft in the drafts queue according to the user selection, and the process ends.

Returning to block 1004, if the user selects to send the email with the reply by entry, then the process passes to block 1006. Block 1006 depicts sending the email with a header that includes the reply by entry to the email server for delivery. Next, block 1008 depicts storing the email in the email storage database. Thereafter, block 1010 illustrates adding a record of the email to the outbox under a sublevel listed by the reply by date in the reply by entry, and the process passes to block 1012.

Block 1012 depicts a determination whether a reply to the email is detected. If a reply to the email is detected, then the process passes to block 1014. Block 1014 illustrates marking the record for the email as replied to and moving the record into the general outbox. Otherwise, at block 1012, if no reply to the email is detected yet, then the process passes to block 1016. Block 1016 depicts a determination whether an action is triggered by the current status of the reply by entry of the email. If an action is not triggered by the current status, then the process returns to block 1012. If an action is triggered by the current status, then the process passes to block 1018. Block 1018 depicts performing the triggered action. Next, block 1020 depicts a determination of whether the email reply by entry is abandoned by the triggered action. If the email reply by entry is not abandoned, then the process returns to block 1012. If the email reply by entry is abandoned, then the process passes to block 1022. Block 1022 depicts marking the record of the email with an abandoned reply to entry and moving the email into the general sent file, and the process ends.

Figure 11:
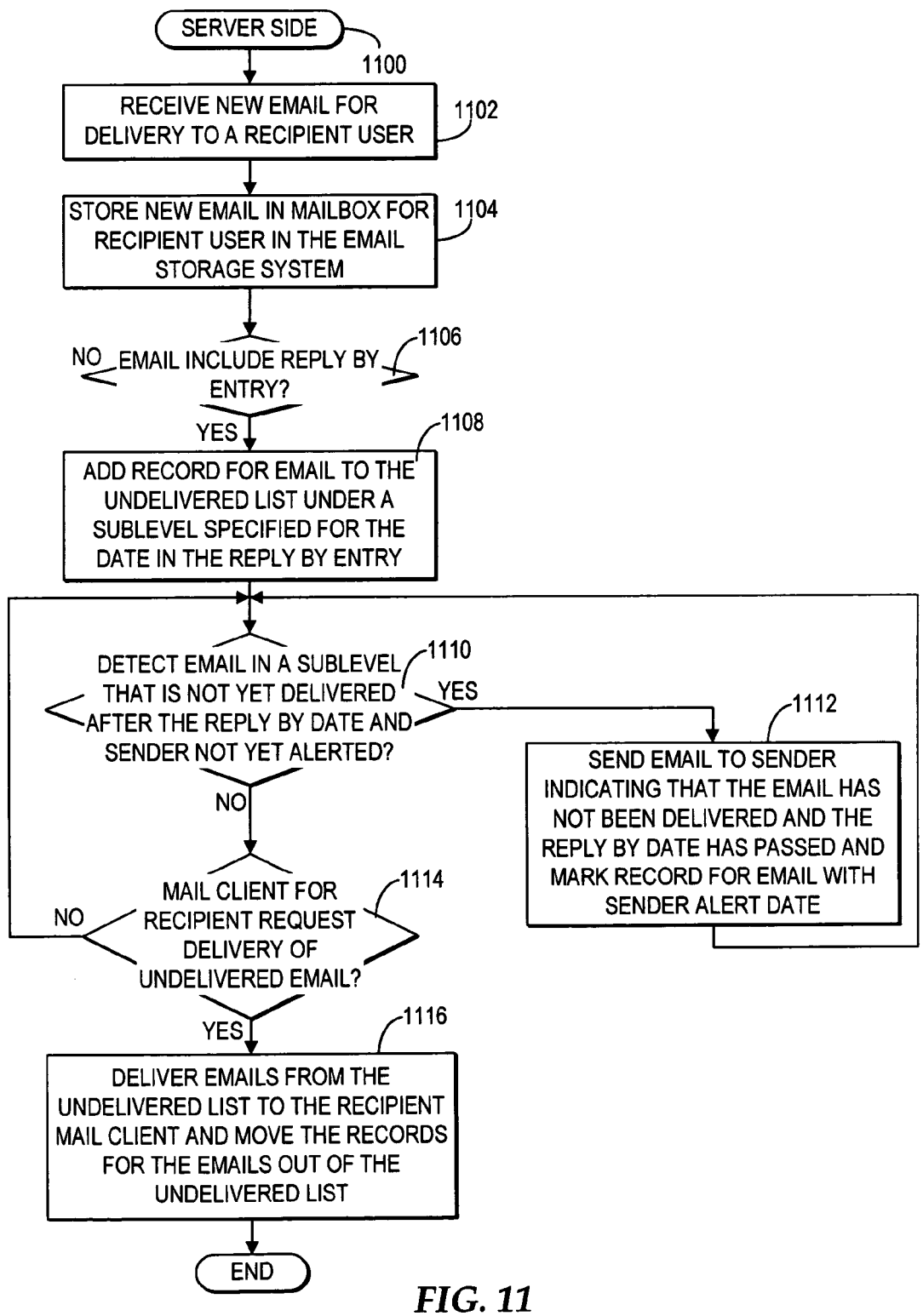
FIG. 11 is a high level logic flowchart depicting a process and program for managing emails with reply by entries at an email server

With reference to FIG. 11, a high level logic flowchart depicts a process and program for managing emails with reply by entries at an email server. As illustrated, the process starts at block 1100 and thereafter proceeds to block 1102. Block 1102 depicts receiving a new email for delivery to a recipient user at an email server. Next, block 1104 illustrates storing the new email in a mailbox for the recipient in the email storage system, and the process passes to block 1106.

Block 1106 depicts a determination whether the email includes a reply by entry. If the email does not include a reply by entry, then the process ends. Otherwise, if the email includes a reply by entry, then the process passes to block 1108. Block 1108 illustrates adding a record for the email to an undelivered list under a sublevel specified for the date in the reply by entry, and the process passes to block 1110. It will be understood that in alternate embodiments, other data management techniques may be implemented to track undelivered emails with reply by entries.

Block 1110 illustrates a determination whether the reply controller detects that an email in a sublevel has not been delivered, the date in the reply entry has passed, and the sender has not yet been alerted. If reply controller detects all these conditions, then the process passes to block 1112. Block 1112 illustrates sending an email to the sender of the undelivered email indicating that the email has not been delivered and the reply by date has passed and marking the record for the email with the sender alert date, and the process returns to block 1110. In addition, although not depicted, when the reply controller detects overdue reply by dates for undelivered messages, the reply controller may attempt to locate the recipient via a chat communication and prompt the recipient to request delivery of the undelivered emails. Additionally, the reply controller may alert the sender or attempt to locate the recipient prior to the expiration of a reply date.

Returning to block 1110, if the reply controller does not detect all the conditions, then the process passes to block 1114. Block 1114 depicts a determination whether a mail client logged into by the recipient requests delivery of the undelivered email. If no delivery request is detected, then the process returns to block 1110. If a delivery request is detected, then the process passes to block 1116. Block 1116 depicts delivering emails with records in the undelivered list to the recipient mail client and removing the records for those emails for the undelivered list, and the process ends.

Figure 12:
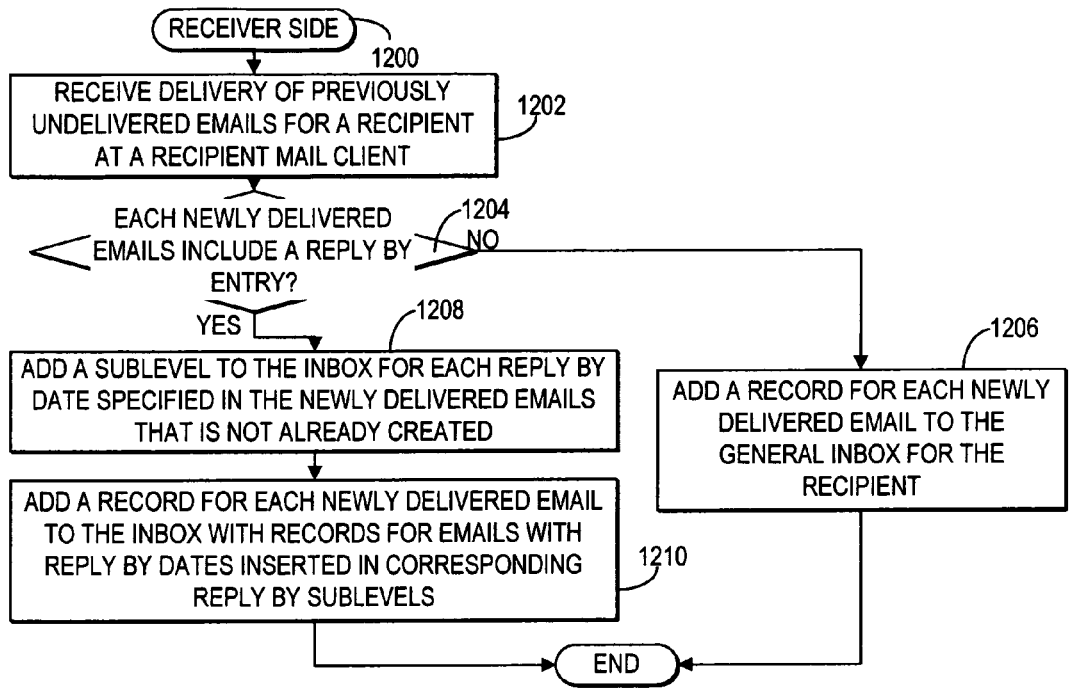
FIG. 12 is a high level logic flowchart illustrating a process and program from managing receipt of emails with reply by entries.

Referring now to FIG. 12, a high level logic flowchart depicts a process and program from managing receipt of emails with reply by entries. As depicted, the process starts at block 1200 and thereafter proceeds to block 1202. Block 1202 depicts receiving delivery of the previously undelivered emails for a recipient at the recipient mail client, and the process passes to block 1204.

Block 1204 illustrates a determination whether each newly delivered email include a reply by entry. If a newly delivered email includes a reply by entry, then the process passes to block 1208. Block 1208 depicts adding a sublevel to the inbox for each reply by date that in the newly delivered email that is not already created in the inbox. Next, block 1210 illustrates adding a record for each newly delivered email with a reply by date to the inbox inserted in corresponding reply by date sublevels, and the process ends.

Returning to block 1204, if a newly delivered email does not include a reply by entry, then the process passes to block 1206. Block 1206 illustrates adding a record for each newly delivered email without a reply by entry to the general inbox for the recipient, and the process ends.

Figure 13:
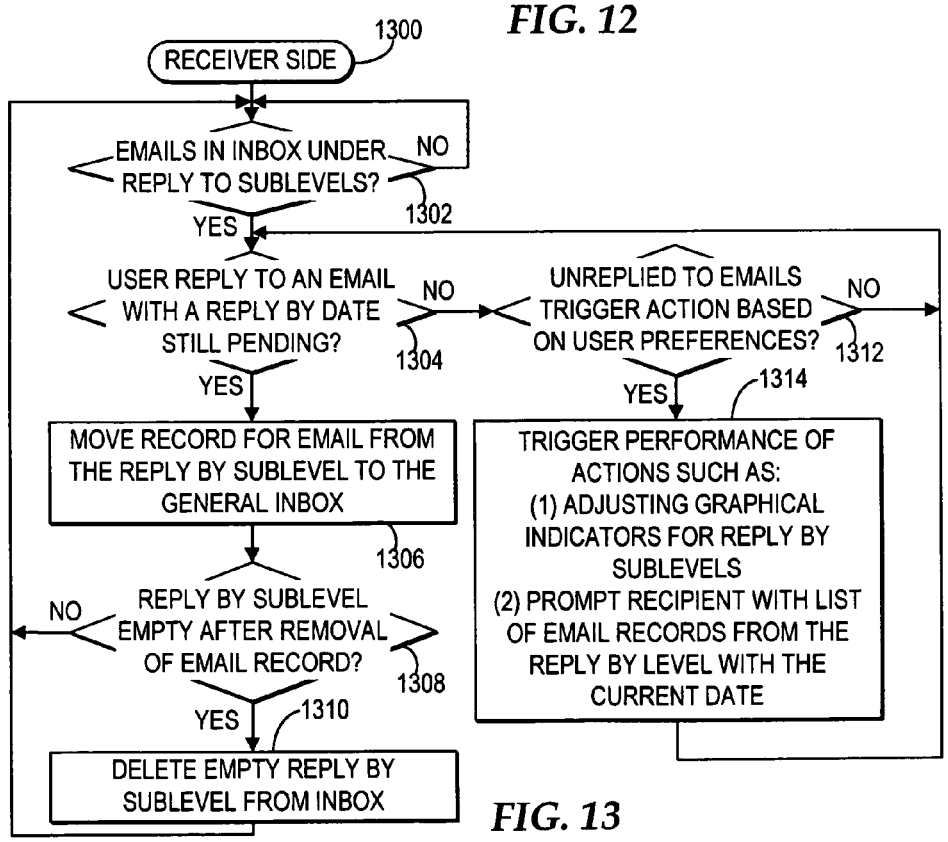
FIG. 13 is a high level logic flowchart depicting a process and program for managing emails with reply by entries after receipt.

With reference now to FIG. 13, a high level logic flowchart depicts a process and program for managing emails with reply by entries after receipt. As illustrated, the process starts at block 1300 and thereafter proceeds to block 1302. Block 1302 depicts a determination whether there are emails in the inbox under the reply to sublevels. When there are emails in the inbox under the reply to sublevels, then the process passes to block 1304.

Block 1304 depicts a determination whether the reply controller detects a reply to an email with a reply by date still pending. If a reply to an email with a reply by date is not detected, then the process passes to block 1312. Block 1312 depicts a determination whether the unreplied to emails trigger actions based on the user preferences. If unreplied to emails do not trigger actions based on the user preferences, then the process returns to block 1304. If unreplied to emails trigger actions based on user preferences, then the process passes to block 1314. Block 1314 depicts performing triggered actions, such as adjusting the graphical indicators for the reply by sublevels in view of the current date and prompting the recipient with a list of email records from the reply by level with the current date, and the process returns to block 1304.

Returning to block 1304, if a user replies to an email with a reply by date still pending, then the process passes to block 1306. Block 1306 depicts moving the record for the replied to email from the reply by sublevel to the general inbox. Next, block 1308 illustrates a determination whether the reply by sublevel is empty after removal of the email record. If the reply by sublevel is not empty, then the process returns to block 1302. If the reply by sublevel is empty after removal of the email record, then the process passes to block 1310. Block 1310 depicts deleting the empty sublevel from the inbox.

While the invention has been particularly shown and described with reference to a preferred embodiment, it will be understood by those skilled in the art that various changes in form and detail may be made therein without departing from the spirit and scope of the invention.

What is claimed is:

1. A system for controlling presentation of an electronic mail message after delivery, comprising:
    a server for receiving via a network, at least one electronic mail message with a header specifying a separate selected reply by date, a selection of applicable recipients less than a plurality of recipients of said electronic mail message, wherein said selection of applicable recipients are selected to receive said separate selected reply by date, and a particular type of reply requested from among a reply by message and a reply by selecting a check read box within said electronic mail message, wherein each said electronic mail message is addressed for delivery of said electronic mail message by said server to said plurality of recipients;
    said server for automatically displaying, within a user interface accessible to said selection of applicable recipients, a separate record for each said electronic mail message within an inbox, wherein said inbox further comprises at least one selectable sublevel, wherein each said selectable sublevel of said inbox is specified with a separate reply by date, wherein upon user selection of a particular selectable sublevel of said inbox, only a selection of records for electronic mail messages with a same reply by date as said selectable sublevel are displayed within said user interface;
    said server for displaying, within said user interface accessible to said selection of applicable recipients, contents of said electronic mail message comprising at least one request for said particular type of reply comprising a textual indicator for said reply by message selection and a selectable button for said reply by selecting a check read box selection;
    said server for comparing a current date with said reply by date for said electronic mail message;
    said server, responsive to detecting said current data exceed said reply by date for said electronic mail message, for detecting whether said particular recipient is accessible for chat communication via said network;
    said server, responsive to detecting said particular recipient is accessible for chat communication, for automatically initiating a chat session between a sender of said electronic mail message and said particular recipient; and
    said server for automatically adjusting each separate sublevel with a separate reply by date with a separate graphical indicator, wherein each said separate graphical indicator indicates a proximity of each said separate reply by date to said current date.

2. The system according to claim 1, wherein said server receives said electronic mail message from a sending client system, wherein said sending client system displays a selectable interface for a user to compose said electronic mail message comprising a reply by selection field comprising a first pull down menu for selecting said separate reply by date from among a plurality of preset reply by dates, a second pull down menu for selecting said selection of applicable recipients from among a plurality of separate groupings of said plurality of recipients comprising at least an addressed directly to group and an carbon copied group, and a third pull down menu for selecting said selection of said particular type of reply requested from among said reply by message and a reply by selecting a check read box and responsive to a user selecting from among the first pull down menu, the second pull down menu, and the third pull down menu within said selectable interface, inserts each said separate reply by date, said selection of applicable recipients, and said selection of said particular type of reply requested in said header of each said electronic mail message for sending to said at least one particular recipient by at least one from among a user sending said electronic mail message and an automatic preference based action.

3. The system according to claim 1, wherein said server receives said electronic mail message with only particular recipients from among a plurality of intended recipients to which to include said reply by date in said electronic email message upon delivery.

4. The system according to claim 1, further comprising:
    said server for monitoring whether said electronic mail message is delivered to said particular recipient for display within said user interface prior to an expiration of said reply by date; and
    said server for automatically notifying a sender of said electronic mail message if said server is unable to deliver said electronic mail message to said particular recipient prior to said expiration of said reply by date.

5. The system according to claim 1, further comprising:
    said server, responsive to detecting a reply by said particular recipient to said electronic mail message, for automatically adjusting said user interface to display of said record for said electronic mail message in a general level of said inbox.

6. The system according to claim 1, further comprising:
    said server for delivering a prompt to said particular recipient to reply to said electronic email when said reply by date is within a particular time of a current date.

7. A method for controlling presentation of an electronic mail message after delivery, comprising:
    receiving, at a server, via a network, at least one electronic mail message with a header specifying a separate selected reply by date, a selection of applicable recipients less than a plurality of recipients of said electronic mail message, wherein said selection of applicable recipients are selected to receive said separate selected reply by date, and a particular type of reply requested from among a reply by message and a reply by selecting a check read box within said electronic mail message, wherein each said electronic mail message is addressed for delivery of said electronic mail message by said server to said plurality of recipients;
    automatically displaying, within a user interface accessible to said selection of applicable recipients, a separate record for each said electronic mail message within an inbox, wherein said inbox further comprises at least one selectable sublevel, wherein each said selectable sublevel of said inbox is specified with a separate reply by date, wherein upon user selection of a particular selectable sublevel of said inbox, only a selection of records for electronic mail messages with a same reply by date as said selectable sublevel are displayed within said user interface;
    said server for displaying, within said user interface accessible to said selection of applicable recipients, contents of said electronic mail message comprising at least one request for said particular type of reply comprising a textual indicator for said reply by message selection and a selectable button for said reply by selecting a check read box selection;
    comparing at said server a current date with said reply by date for said electronic mail message;

responsive to detecting said current date exceed said reply by date for said electronic mail message, detecting at said server whether said particular recipient is accessible for chat communication via said network;

responsive to detecting said particular recipient is accessible for chat communication, automatically initiating a chat session between a sender of said electronic mail message and said particular recipient; and automatically adjusting within said user interface each separate sublevel with a separate reply by date with a separate graphical indicator, wherein each said separate graphical indicator indicates a proximity of each said separate reply by date to said current date.

8. The method according to claim 7, further comprising: receiving said electronic mail message at said server from a sending client system, wherein said sending client system displays a selectable interface for a user to compose said electronic mail message comprising a reply by selection field comprising a first pull down menu for selecting said separate reply by date from among a plurality of preset reply by dates, a second pull down menu for selecting said selection of applicable recipients from among a plurality of separate groupings of said plurality of recipients comprising at least an addressed directly to group and an carbon copied group, and a third pull down menu for selecting said selection of said particular type of reply requested from among said reply by message and a reply by selecting a check read box and responsive to a user selecting from among the first pull down menu, the second pull down menu, and the third pull down menu within said selectable interface, inserts each said separate reply by date, said selection of applicable recipients, and said selection of said particular type of reply requested in said header of each said electronic mail message for sending to said at least one particular recipient by at least one from among a user sending said electronic mail message and an automatic preference based action.

9. The method according to claim 7, further comprising: receiving said electronic mail message at said server with only particular recipients from among a plurality of intended recipients to which to include said reply by date in said electronic email message upon delivery.

10. The method according to claim 7, further comprising: monitoring at said server whether said electronic mail message is delivered to said particular recipient for display within said user interface prior to an expiration of said reply by date; and automatically notifying a sender of said electronic mail message if said server is unable to deliver said electronic mail message to said particular recipient prior to said expiration of said reply by date.

11. The method according to claim 7, further comprising: responsive to detecting a reply by said particular recipient to said electronic mail message, automatically adjusting said user interface to display of said record for said electronic mail message in a general level of said inbox.

12. The method according to claim 7, further comprising: delivering a prompt from said server to said particular recipient to reply to said electronic email when said reply by date is within a particular time of a current date.

13. A program for controlling presentation of an electronic mail message after delivery, said program embodied in a non-transitory computer-readable storage medium, said program comprising computer-executable instructions which cause a computer to perform the steps of:

controlling receipt of at least one electronic mail message with a header specifying a separate selected reply by date, a selection of applicable recipients less than a plurality of recipients of said electronic mail message, wherein said selection of applicable recipients are selected to receive said separate selected reply by date, and a particular type of reply requested from among a reply by message and a reply by selecting a check read box within said electronic mail message, wherein each said electronic mail message is addressed for delivery of said electronic mail message by said server to said plurality of recipients;

controlling display, within a user interface accessible to said selection of applicable recipients, a separate record for each said electronic mail message within an inbox, wherein said inbox further comprises at least one selectable sublevel, wherein each said selectable sublevel of said inbox is specified with a separate reply by date, wherein upon user selection of a particular selectable sublevel of said inbox, only a selection of records for electronic mail messages with a same reply by date as said selectable sublevel are displayed within said user interface;

controlling display, within said user interface accessible to said selection of applicable recipients, contents of said electronic mail message comprising at least one request for said particular type of reply comprising a textual indicator for said reply by message selection and a selectable button for said reply by selecting a check read box selection;

comparing at said server a current date with said reply by date for said electronic mail message;

responsive to detecting said current date exceed said reply by date for said electronic mail message, detecting at said server whether said particular recipient is accessible for chat communication via said network;

responsive to detecting said particular recipient is accessible for chat communication, automatically initiating a chat session between a sender of said electronic mail message and said particular recipient; and automatically adjusting within said user interface each separate sublevel with a separate reply by date with a separate graphical indicator, wherein each said separate graphical indicator indicates a proximity of each said separate reply by date to said current date.

* * * * *